United States Patent
Ratteree et al.

[15] 3,677,655
[45] July 18, 1972

[54] BRAKE DRUM TRUING METHOD AND APPARATUS

[72] Inventors: James Ratteree, 4126 Flat Ridge Drive, Stone Mountain, Ga. 30083; James A. Seaman, 4900 Northside Drive, N.W., Atlanta, Ga. 30309

[22] Filed: Nov. 5, 1970

[21] Appl. No.: 87,146

Related U.S. Application Data

[63] Continuation-in-part of Ser. No. 40,120, May 25, 1970.

[52] U.S. Cl. ..................................... 408/1, 408/72, 408/87, 408/110, 408/124, 82/4, 29/401
[51] Int. Cl. ......................................................... B23b 35/00
[58] Field of Search .................. 82/4, 4 A; 408/1, 72, 84, 87, 408/95, 97, 99, 100, 110, 112, 115, 124; 29/401

[56] References Cited

UNITED STATES PATENTS

| | | | |
|---|---|---|---|
| 2,518,929 | 8/1950 | Peters | 82/4 |
| 1,676,414 | 7/1928 | Romano et al. | 408/72 |
| 1,617,554 | 2/1927 | Swartz | 408/115 |
| 757,950 | 4/1904 | McElwain et al. | 408/84 |

*Primary Examiner*—Leonidas Vlachos
*Attorney*—B. J. Powell

[57] ABSTRACT

Apparatus and method for redefining the central opening through a brake drum so that the central opening is concentric with respect to the lug hole arrangement in the brake drum wherein the apparatus includes a support means carrying a plurality of support pins which engage and support the brake drum through its lug holes, a tool for selected engagement with the brake drum about its central opening and positioning means for locating the tool along the effective rotational axis of the brake drum when carried by the support means so that the tool can engage the drum and redefine the central opening concentric about the rotational axis and within the lug hole arrangement. The support pins may be mounted in an adapter so as to provide for different lug hole arrangements.

The method includes supporting a brake drum to have its central opening redefined; positioning a tool concentrically within the lug hole arrangement; and engaging the brake drum about its central opening with the tool while maintaining its concentricity with respect to the lug hole arrangement to redefine the central opening.

10 Claims, 7 Drawing Figures

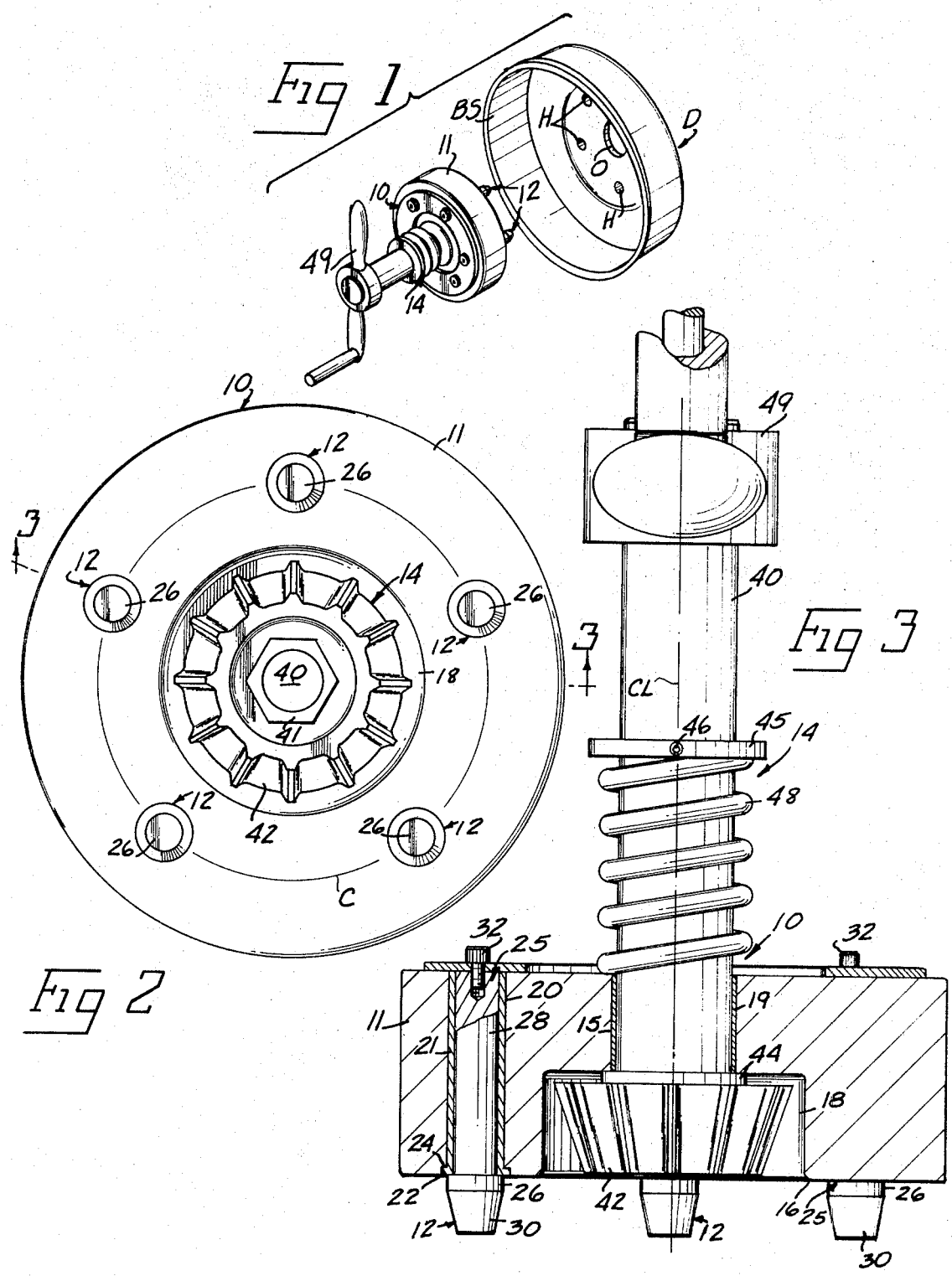

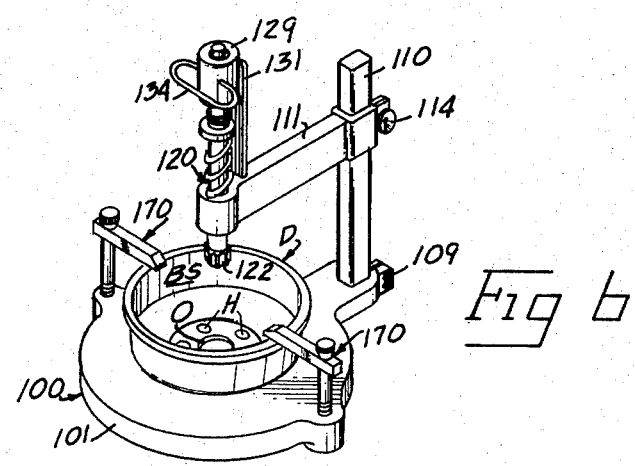
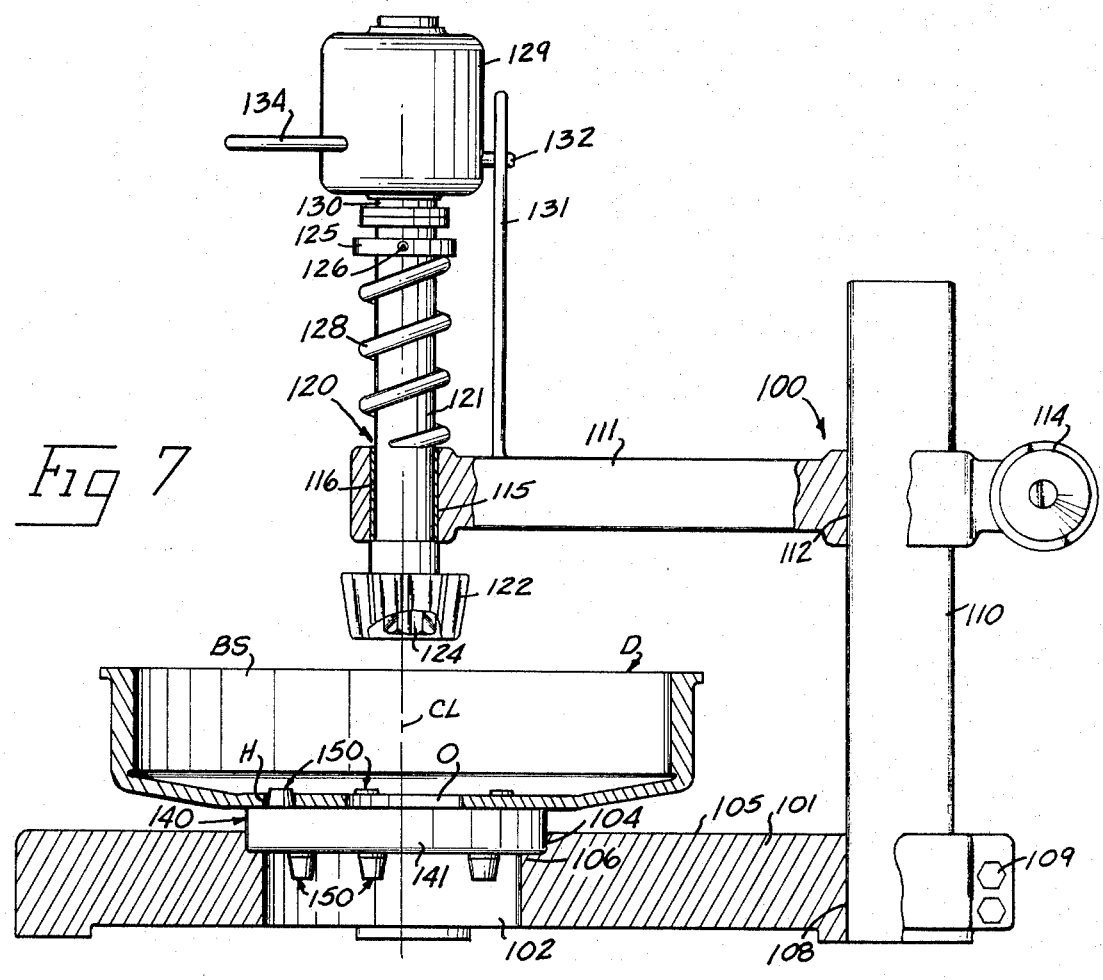

BRAKE DRUM TRUING METHOD AND APPARATUS

CROSS-REFERENCE TO RELATED APPLICATIONS

This application is a continuation-in-part of our co-pending application, Ser. No. 40,120, filed May 25, 1970 entitled "Brake Drum Turning Method and Apparatus."

BACKGROUND OF THE INVENTION

On vehicles equipped with drum type brakes, the braking surfaces inside the brake drums frequently lose their concentricity with respect to the effective rotational axis of the drum thereby necessitating returning of the drums to re-establish the concentricity. This loss of concentricity is due primarily to the fact that the brake shoes do not expand in such a manner as to maintain equal contact along all portions of the shoes and results in loss of braking efficiency.

Most brake drum lathes which are used to re-turn the braking surfaces of these drums support the drums by the central opening defined therethrough while turning same. This arrangement has proven satisfactory for supporting those brake drums which are also supported on the vehicle by this central opening. Certain brake drums are not, however, supported through this central opening but rather through the lug holes by the lug bolts on a spider carried by the wheel assembly. This is generally the case with most rear wheel assemblies. Because the brake drum is not supported by this central opening, the dimensional and location tolerances are not sufficient to insure concentricity of this opening and the braking surface, resulting many times in the braking surface, when re-turned, to still be out of concentricity with the effective rotational axis of the brake drum.

SUMMARY OF THE INVENTION

These and other problems and disadvantages associated with prior art techniques for refinishing or re-turning braking surfaces of brake drums supported on the vehicle through the lug holes rather than the central opening are overcome by the invention disclosed herein by re-locating the central opening concentrically with respect to the effective rotational axis of the brake drum while it is on the vehicle. This is accomplished using the lug hole circle to locate the opening under a cutting tool since the lug hole circle is always concentric about the effective rotational axis of this type of brake drum. An adapter is provided which includes a plurality of locating pins which fit in the lug holes of the drum and locate the cutting tool concentrically within the lug hole circle to insure that the central opening through the drum will be trued.

The method of the invention includes the steps of locating a cutting tool concentrically with respect to the lug hole circle in the drum and engaging the drum about its central opening with the tool while maintaining the concentricity to cause the tool to relocate the opening concentrically with respect to the lug holes.

The apparatus of the invention includes a portable version and a stationary version. The portable version includes a support member which carries a plurality of pins corresponding in location and number to that of the lug holes in the brake drum. A cutting tool is rotatably mounted in the support member concentrically with respect to the pin arrangement and is spring urged away from the plane of the drum when positioned on the drum but can be selectively moved into engagement with the drum about the central opening to redefine the central opening concentric with the lug hole circle.

The stationary or table version includes a base member which defines a positioning recess therein with an adapter releasably carried by the recess. The adapter has a first set of pins on one side thereof which correspond in location and number with the lug holes in a first size brake drum. The adapter also has a second set of pins which correspond in location and number to another set of lug holes in a different size drum. Both sets of pins are arranged so as to position the brake drum about a common centerline on the base member about which the lug hole circle of the drum is concentric. The base member also rotatably mounts a cutting tool along the common centerline above the adapter. The tool is spring urged away from the adapter to facilitate the placement of the drum on the adapter, but can be moved into engagement with the drum to redefine the central opening concentric with the lug hole circle. The pins in the adapter may be spring loaded to facilitate the seating of the drum on the adapter.

These and other features and advantages of the invention will become more fully understood upon consideration of the following specification and accompanying drawings in which like characters of reference designate corresponding parts throughout the several views and wherein.

BRIEF DESCRIPTION OF THE DRAWINGS

FIG. 1 is a perspective view showing the portable embodiment of the invention ready for use;

FIG. 2 is a front elevational view of that embodiment of the invention shown in FIG. 1;

FIG. 3 is a cross-sectional view taken substantially along line 3—3 in FIG. 2;

FIG. 6 is a perspective view of the second embodiment of the invention; and,

FIG. 7 is an elevational view of the second embodiment of the invention shown partly in cross-section with the invention in use.

Figure 4:
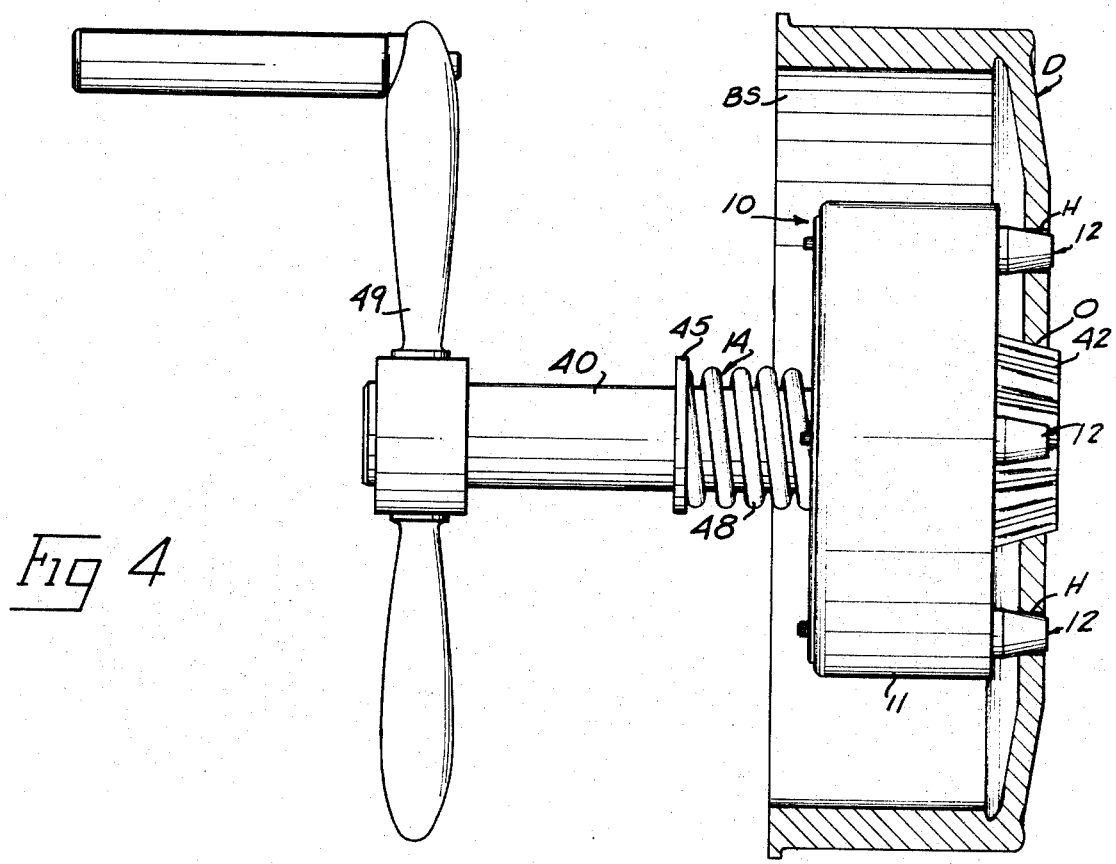
FIG. 4 is a side elevational view showing that embodiment of the invention of FIG. 1 in use.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Referring specifically to FIGS. 1–4, it will be seen that the first embodiment of the invention or portable device 10 includes a housing 11 carrying a plurality of support pin assemblies 12 and a cutter assembly 14.

The housing 11 is generally disk shaped and defines an axially extending bore 15 along the centerline CL thereof as best seen in FIG. 3. The working face 16 of housing 11 defines a counterbore 18 therein concentrically about the end of bore 15 which receives the cutting tool therein as will be explained later. The bore 15 receives a bushing 19 therein which rotatably supports the cutter assembly 14 as described below.

The housing 11 also defines a plurality of pin receiving passages 20 therethrough which are parallel to the bore 15 and equally spaced from each other along a circle C (see FIG. 2) concentric with bore 15. The circle C corresponds in diameter to the lug hole circle of a specific size brake drum D as seen in FIGS. 1 and 4 and the passages 20 correspond in number to the lug holes H through the drum D to be used with the device 10.

The pin assemblies 12 are positioned in the passages 20 and project out from the working face 16 of housing 11. Each pin assembly 12 includes a bushing 21 with an annular flange 22 at one end thereof which fits in a complementary recess 24 about that end of passage 20 opening onto working face 16. A support pin 25 having an enlarged head portion 26 and a reduced diameter shank portion 28 is provided for each assembly 12 as seen in FIG. 3. The reduced diameter portion 28 is just sufficient to be received in the passage 29 through bushing 21 thus leaving the head portion 26 exposed over the working surface 16 of housing 11. The head portion 26 of each support pin 25 is tapered at the extending end thereof as indicated at 30 to facilitate the insertion of the pins 25 in the lug holes H as best seen in FIG. 4.

To retain each pin assembly 12 in place, the extending end of each shank portion 28 is tapped and a retaining ring 31 is attached to each of the assemblies 12 through fasteners 32 engaging the tapped ends of shank portions 28. This clamps the housing 11 between the ring 31 and the flange 22 of bushing 21 to hold the assemblies 12 in place. Since the pin assemblies 12 are concentrically located about the centerline CL of the portable device 10, the centerline CL will lie along the effective rotational axis of a brake drum D supported on a vehicle (not shown) through its lug holes H when the tapered ends 30 of the pins 25 are positioned in the lug holes of the drum as seen in FIG. 4.

The cutter assembly 14 is carried in bore 15 as best seen in FIG. 3 and includes a spindle 40 which is rotatably positioned in bushing 19 carried in bore 15. That end of spindle 40 extending into counterbore 18 is threaded to receive a nut 41 thereon (see FIG. 2) to position a cutting tool 42 on the lower end of spindle 40. The spindle 40 is provided with a shoulder 44 which prevents the tool 42 from striking the end of counterbore 18 as the spindle 40 is moved upwardly as seen in FIG. 3.

A collar 45 is positioned on the spindle 40 above the housing 11 by screw 46 and maintains a spring 48 around spindle 40. The spring 48 extends between the collar 45 and top of housing 11 to constantly urge the spindle 40 so as to retract the tool 42 within the counterbore 18. A handle 49 is mounted at the upper end of spindle 40 for selectively rotating the spindle and cutting tool 42 and for causing the tool to be extended from counterbore 18 and engage the brake drum D about its central opening 0 as seen in FIG. 4 when the handle 49 is depressed.

In operation, it will be seen that the device 10 is used by placing the tapered ends 30 of pins 25 in the lug holes H of the drum D as seen in FIG. 4. While the device 10 is shown on the inside of the drum in FIG. 4, it is to be understood that the device 10 could just as easily be used from the other side of the drum D. When the pins 25 are in the lug holes H, this lines up the centerline CL of the device 10 with the effective rotational axis of the drum while it is mounted on the vehicle. Since the cutting tool 42 is always maintained concentric about the centerline CL, it can be moved into engagement with the drum about the central opening 0 to redefine the opening 0 so that it is concentric with respect to the effective rotational axis of the drum and the lug hole circle C. This allows the drum D to then be mounted on a conventional brake drum lathe (not shown) and the braking surface BS re-turned so that it is concentric with the effective rotational axis of the drum.

Figure 5:
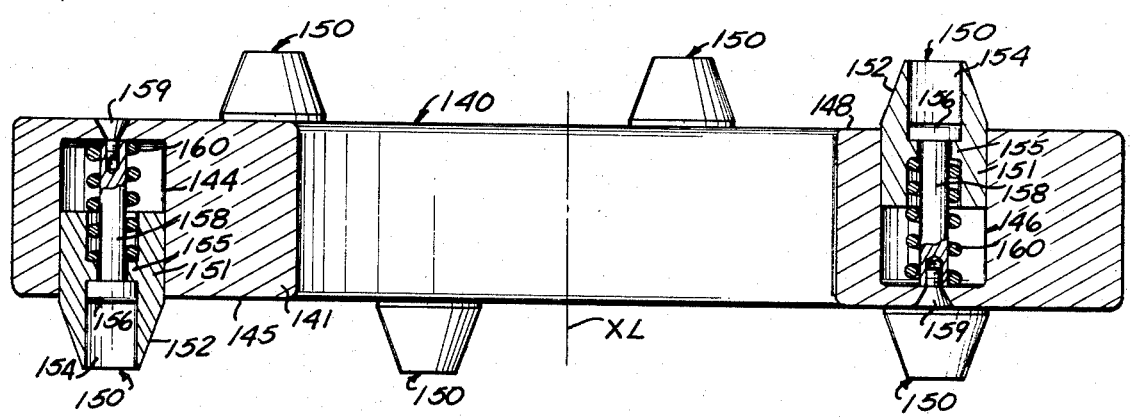
FIG. 5 is a cross-sectional view of the adapter of the second embodiment of the invention.

Referring now to FIGS. 5–7, the device 100 is a stationary version of the invention. The device 100 includes a base member 101 adapted to sit on a table and defining a bore 102 therethrough with a counterbore 104 at the upper end thereof which opens onto the upper working surface 105 of the base member 101. The juncture of the bore 102 and counterbore 104 provides a shoulder 106 as will be explained below. Both bore 102 and counterbore 104 are concentric about common centerline CL.

The base member 101 also defines a passage 108 therethrough which is displaced laterally from the bore 102 and which has its axis parallel to the centerline CL. The base member is split at passage 108 and provided with a fastener 109 therethrough to reduce the diameter of passage 108 and clamp an upstanding standard 110 therein as seen in FIGS. 6 and 7. It will be seen that standard 110 extds above the base member 101 parallel to the centerline CL of bore 102 and counterbore 104.

A positioning arm 111 is carried by the standard 110. The arm 111 defines a passage 112 through one end thereof which is slidably receivable around the standard 110 to position the arm 111 parallel to the working surface 105 of base member 101. The arm 111 is split at the passage 112 and provided with fastener 114 to selectively clamp the arm 111 at any position vertically along standard 110. The standard 110 and passages 108 and 112 have a square cross-section so as to maintain the rotational position of the arm 111 fixed with respect to standard 110 as the arm is selectively moved along the standard 110.

The extending end of arm 111 defines a passage 115 therethrough which has its axis aligned with the centerline CL of bore 102 and counterbore 104. A journal bearing 116 is provided in passage 115 which mounts the cutter assembly 120.

The cutter assembly 120, like the cutter assembly 12, includes a spindle 121 which is rotatably and slidably received through journal bearing 116. The spindle 121 is adapted to receive a cutting tool 122 on its lower end extending below arm 111 and held thereon by a nut 124. A collar 125 is positioned on spindle 121 by screw 126 and maintains a spring 128 around spindle 121 between collar 125 and the top of arm 111. The spring 128 is effective to constantly urge spindle 121 upwardly so as to draw tool 122 away from base member 101 yet will allow the spindle 121 to be forced downward toward the base member 101.

The upper end of the spindle 121 may be provided with a handle for manually rotating the spindle and tool 122 as with the device 10, however, a motor 129 is shown with its drive shaft 130 attached to the upper end of spindle 121. The motor 129 is carried by spindle 121 and is movable therewith. A guide 131 is carried by arm 111 and extends up beside motor 129 to be engaged by a tongue 132 on motor 129 for preventing rotation of motor 129 when it is rotating spindle 121. A handle 134 is also provided on motor 129 for forcing the motor and spindle 121 as well as tool 122 downwardly toward base member 101.

An adapter 140 as seen in FIGS. 5 and 7 is provided for holding the brake drum D in the proper position for the tool 122 to redefine the central opening 0 in the drum so that it is concentric with the effective rotational axis of the drum. The adapter 140 includes a disk shaped backing plate 141 having a diameter just sufficient to be received in the counterbore 104 and rest on shoulder 106 as best seen in FIG. 7.

Referring back to FIG. 5, the plate 141 defines a central opening 142 therethrough which is larger in diameter than the opening 0 through drum D. The opening 142 is concentric about the centerline XL of adapter 140. When adapter 140 is placed in counterbore 104, the centerline XL coincides with centerline CL of the counterbore 104. The plate 141 defines a first set of recesses 144 therein which open onto one working face 145 of plate 141. These recesses 144 are circumferentially spaced along a circle having a diameter corresponding to that of the lug hole circle in one standard brake drum. The recesses 144 also correspond in spacing and number to the lug holes in the brake drum. The plate 141 also defines a second set of recesses 146 which open onto the opposite working face 148 of plate 141. The recesses 146 are arranged similarly to recesses 144 except on a circle for a different size brake drum lug hole circle.

A pin assembly 150 is received in each recess 144 and 146 for engaging a lug hole in the brake drum. The pin assembly 150 includes a support pin 151 which is slidably received in recess 144 or 146. The exposed portion of each pin 151 is tapered at 152 and defines a central opening 154 therethrough. An annular retaining flange 155 extends into the opening 154 intermediate its ends which is engaged by the head 156 of anchor member 158 to retain pin 151 in recess 144 or 146. The anchor member 158 is held in recess 144 or 146 by screw 159 in the plate 141. A spring 160 received around anchor member 158 between flange 155 and the closed end of recess 144 or 146 constantly urges the pin 151 from the recess against head 156.

Clamping members 170 as seen in FIG. 6 may be provided on base member 101 spaced outwardly of the counterbore 104 to clamp the adapter 140 and drum D in position for cutting the central opening 0. The members 170 urge the drum D and pins 151 against springs 160 to firmly seat the drum D against that working face of the adapter 140 being used.

From the foregoing, it will be seen that the adapter 140 is placed in counterbore 104 so that the pins 151 arranged along a circle corresponding to the lug hole circle of the drum D to be turned are extending upwardly. The drum D is then placed on the adapter 140 so that the lug holes H are positioned on the upturned pins 151. This aligns the drum D so that its effective rotational axis lies along the centerline CL of the counterbore 104 and the cutting tool 122. The operator then grasps handle 134 after starting motor 129 and lowers tool 122 into contact with the drum D around opening 0 to redefine the opening 0 so that it is concentric about the effective rotational axis of the drum. After this operation is completed, the drum D can be mounted on a brake drum lathe and re-turned in conventional manner to properly define the braking surface BS concentric with the effective rotational axis of the drum.

By using different adapters 140, it will be seen that that different size brake drums may be adjusted for re-turning the braking surface. Further, the adapter 140 provides for the proper support of the brake drum D for two different sizes simply by turning the adapter over.

The tools 42 and 122 shown are reamers, however, it is to be understood that different types of cutting and grinding tools may be substituted therefor.

While specific embodiments of the invention have been described herein, it is to be understood that full use may be made of modifications, substitutions, and equivalents without departing from the scope of the inventive concept.

We claim:

1. Apparatus for redefining the central opening through a brake drum to establish concentricity between the central opening and the circle along which the lug holes through which the brake drum is supported on the vehicle lie, said apparatus including:
   support means for engaging the brake drum through its lug holes and supporting the brake drum;
   a tool for selected engagement with the brake drum about the central opening therethrough; and,
   positioning means for positioning said tool along the effective rotational axis of the brake drum while carried by said support means for selected engagement of said tool about the central opening in the drum to redefine the central opening concentrically with respect to the effective rotational axis of the drum and the circle along which the lug holes lie.

2. The apparatus of claim 1 wherein said support means includes a plurality of support pins arranged in a configuration corresponding to the arrangement of the lug holes in the brake drum and each having a size to be received in the lug holes and support the brake drum; and, wherein said positioning means locates said tool concentrically within said pin arrangement.

3. The apparatus of claim 2 wherein said positioning means includes a spring for constantly urging said tool away from engagement with the brake drum around the central opening.

4. The apparatus of claim 3 wherein said support means includes a second plurality of support pins arranged in a configuration corresponding to another arrangement of the lug holes in a brake drum and wherein said first plurality of support pins and said second plurality of support pins are arranged to alternately support a brake drum under said tool.

5. The apparatus of claim 4 further including drive means for selectively rotating said tool while it is in engagement with said brake drum.

6. A device for redefining the central opening through a brake drum so that the opening is concentric with respect to the lug hole arrangement in the brake drum, said device including:
   a housing defining a central bore therethrough, a counterbore recess at one end of said bore, and a plurality of pin receiving passages circumferentially spaced about a circle concentric about the common centerline of said bore and counterbore; said pin receiving passages corresponding in arrangement with the lug hole arrangement in the brake drum;
   a pin assembly mounted in each pin receiving passage in said housing and including a tapered portion extending from said housing on the same side thereof as said counterbore, said tapered portion receivable in a lug hole of the brake drum; and,
   a cutter assembly mounted in said bore in said housing, said cutter assembly including a spindle rotatably journaled in said bore for rotational and axial movement therein, a cutting tool attached to the end of said spindle extending into said counterbore, a spring connected to said spindle for constantly urging said cutting tool toward said counterbore, and a handle connected to the opposite end of said spindle for forcing said cutting tool from said counterbore and into engagement with the brake drum about its central opening and for rotating said cutting tool to redefine the central opening concentric with the effective rotational axis of the brake drum.

7. A device for redefining the central opening through a brake drum so that the central opening is concentric with respect to the lug hole arrangement in the brake drum, said device including:
   a base member defining a counterbore therein;
   an upright standard carried by said base member, oriented parallel to the centerline of said counterbore, and laterally spaced from said counterbore;
   a positioning arm slidably mounted on said standard for movement along said standard, said arm including locking means for selectively fixing said arm with respect to said standard;
   a tool assembly carried by the extending end of said arm, said tool assembly including a spindle rotatably and slidably journaled in the extending end of said arm above said counterbore and lying along the centerline of said counterbore, a tool adapted to engage the brake drum about its central opening to redefine same mounted on the lower end of said spindle and rotatable therewith, a spring connected to said spindle and said arm for constantly urging said spindle and said tool away from said base member, and drive means for selectively rotating said spindle and said tool; and,
   an adapter selectively positionable in said counterbore in said base member to carry the brake drum thereon, said adapter including an annular support plate having a diameter just sufficient to be received in said counterbore and a first plurality of support pins corresponding in size and arrangement to the lug hole arrangement in the brake drum, said arrangement of support pins being concentrically located about the centerline of said counterbore when said support plate is carried therein so that the centerline of said counterbore lies along the effective rotational axis of the brake drum carried by said support pins for said tool to be lowered into contact with the drum about the central opening to redefine the opening concentric about the effective rotational axis of the drum and with the lug hole arrangement.

8. A device as set forth in claim 7 wherein said adapter includes a second plurality of support pins on the opposite side of said support plate from said first plurality of support pins, said second plurality of support pins corresponding in size and arrangement to a different lug hole arrangement in a brake drum and located concentrically about the centerline of said counterbore when said support plate is carried by said counterbore so that, by turning said support plate over, a different size brake drum can be trued and wherein each pin is spring urged from said support plate; and further including clamping means for clamping the brake drum onto said adapter.

9. A method for relocating the central opening in a brake drum supported on a vehicle through its lug holes including the steps of:
   a. supporting the brake drum to have its central opening relocated;
   b. positioning a tool concentrically within the circle defined by the lug holes; and,
   c. engaging the brake drum with the tool while maintaining the tool concentrically within the lug hole circle so that the central opening is redefined to conform to the cutting tool.

10. A method as set forth in claim 9 wherein the step of supporting the brake drum includes positioning the brake drum so that its lug holes are received over a plurality of support pins arranged concentrically about the centerline of the tool.

* * * * *